(12) United States Patent
Chisholm

(10) Patent No.: US 6,860,494 B1
(45) Date of Patent: Mar. 1, 2005

(54) COLLAPSIBLE MAINTENANCE WORK CART SYSTEM

(76) Inventor: Karan L. Chisholm, 9036 127th St., Seminole, FL (US) 33776

( * ) Notice: Subject to any disclaimer, the term of this patent is extended or adjusted under 35 U.S.C. 154(b) by 3 days.

(21) Appl. No.: 10/338,384

(22) Filed: Jan. 8, 2003

(51) Int. Cl.$^7$ ................................................ B62B 3/00
(52) U.S. Cl. ................................ 280/47.35; 280/47.19; 280/79.2; 280/651
(58) Field of Search ............................ 280/47.35, 651, 280/47.19, 47.34, 47.17, 47.18, 47.28, 47.47, 79.11, 79.2, 79.3; 211/194, 94.01; 312/257.1, 350

(56) References Cited

U.S. PATENT DOCUMENTS

| | | | | |
|---|---|---|---|---|
| 1,427,388 A | * | 8/1922 | Holley | 280/79.2 |
| 1,562,089 A | * | 11/1925 | Holley | 280/47.35 |
| 1,962,454 A | * | 6/1934 | Meanor et al. | 280/79.2 |
| 1,985,412 A | * | 12/1934 | Jackson | 280/79.2 |
| 2,116,312 A | * | 5/1938 | Hollett | 280/79.2 |
| 2,948,798 A | * | 8/1960 | Ness | 280/79.2 |
| 4,923,202 A | * | 5/1990 | Breveglieri et al. | 280/47.35 |
| 5,125,520 A | * | 6/1992 | Kawasaki | 211/194 |
| 5,326,117 A | * | 7/1994 | Cook | 280/79.2 |
| 5,887,878 A | * | 3/1999 | Tisbo et al. | 280/47.19 |
| 6,079,719 A | * | 6/2000 | Tisbo et al. | 280/47.35 |
| 6,213,483 B1 | * | 4/2001 | Gaffney | 280/47.35 |

* cited by examiner

Primary Examiner—Hau Phan
(74) Attorney, Agent, or Firm—Edward P. Dutkiewicz

(57) ABSTRACT

A cork cart has a generally pan shaped rectilinear cart base with a plurality of brackets receiving a sliding shelf, a pan shaped rectilinear cart middle shelf, and a pan shaped rectilinear top shelf with a hole near each end and a recess in the forward edge. A plurality of T-pieces each with a bolt hole and a locking pin hole are coupled to corners of the car. The cart has a plurality of wheels. A frame nas four vertical corner pieces having a plurality of bolt hole. There is plurality of bolt and rut subassemblies. A handle has a gripping portion and an attachment portion and a roll towel mounting portion. A locking pin subassembly has a pin portion and a spring. There is a bag ring.

4 Claims, 3 Drawing Sheets

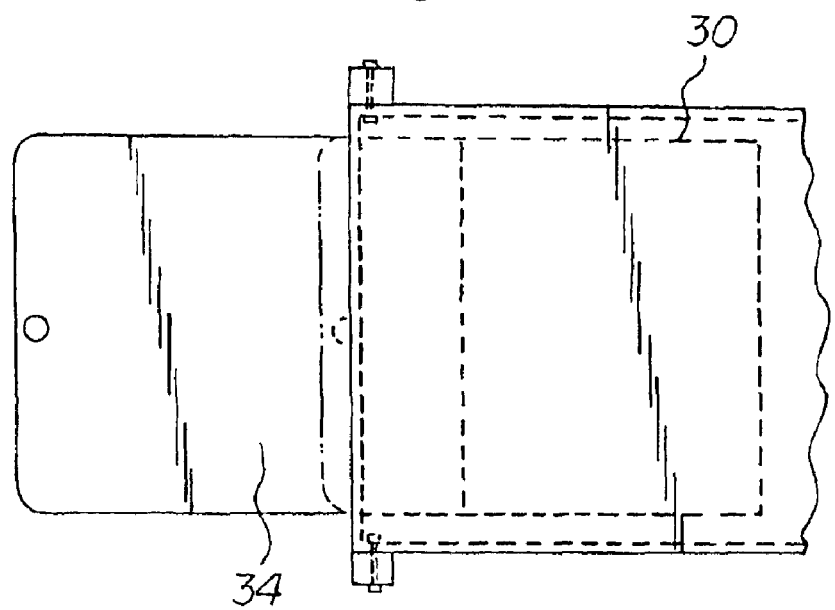
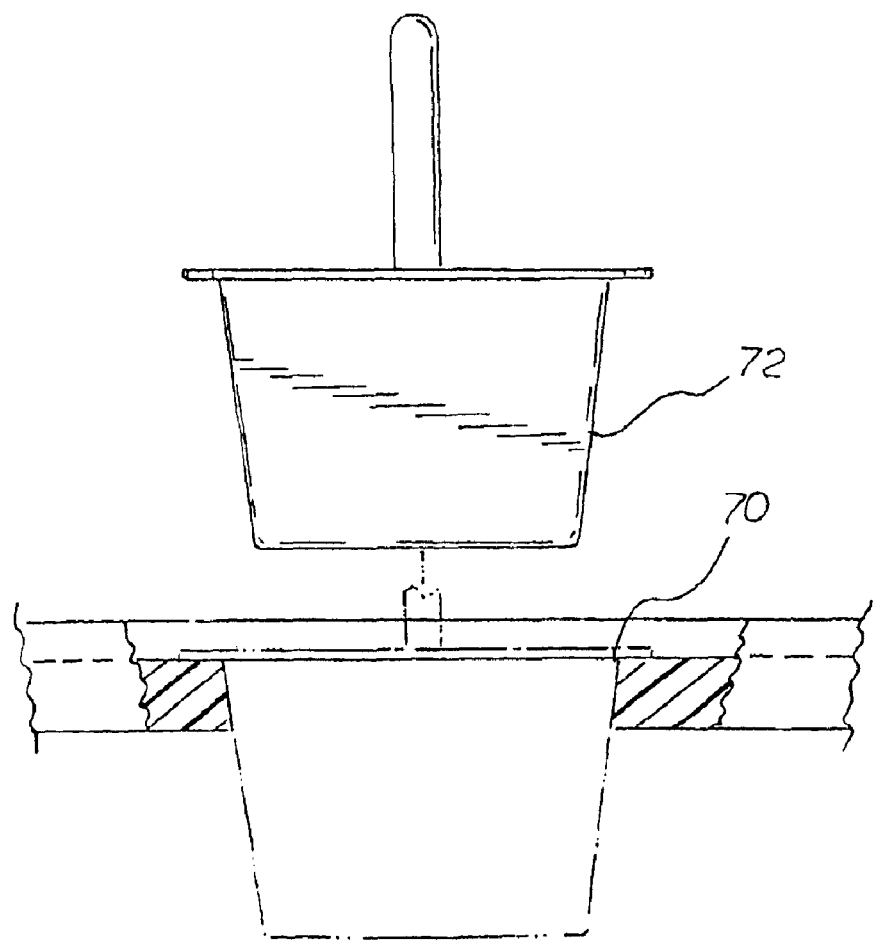

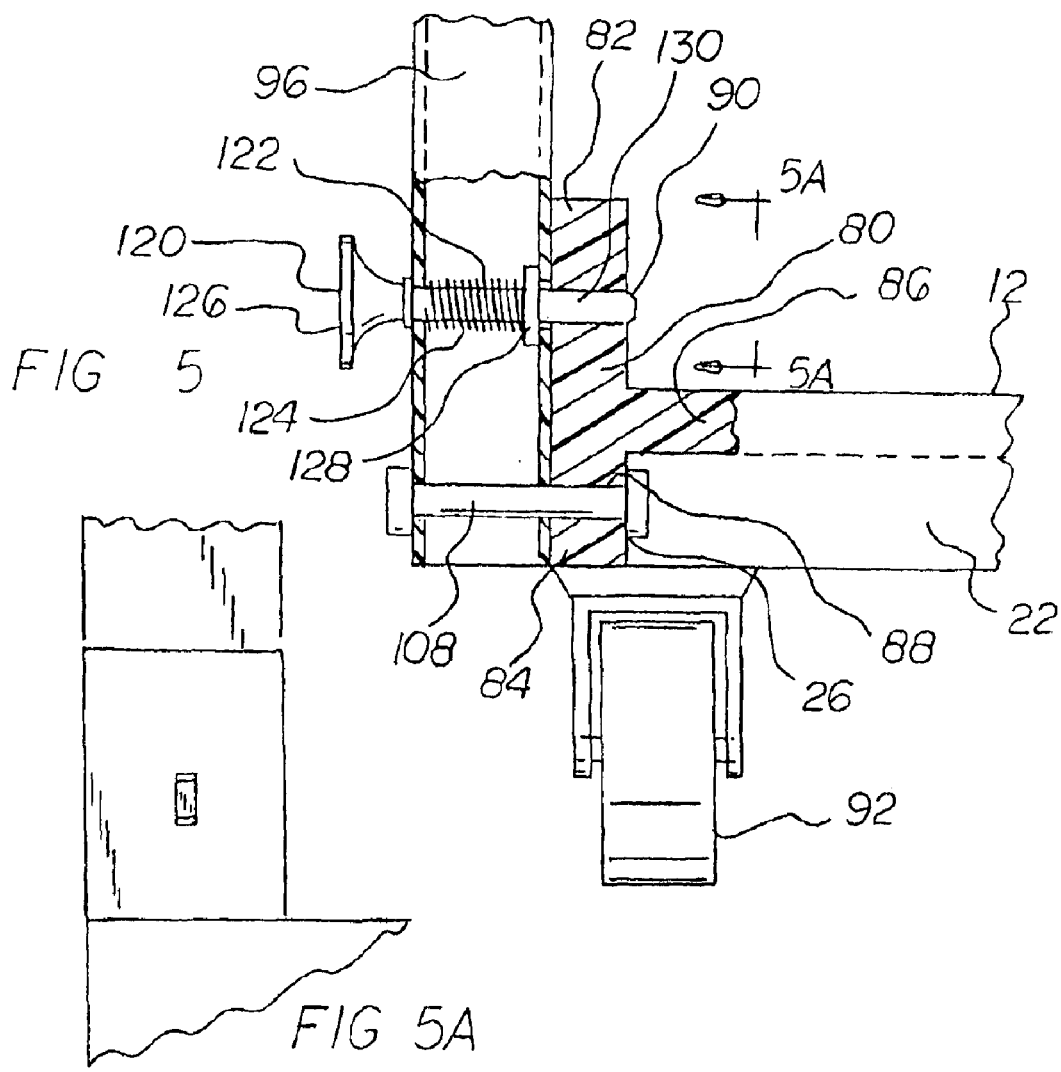
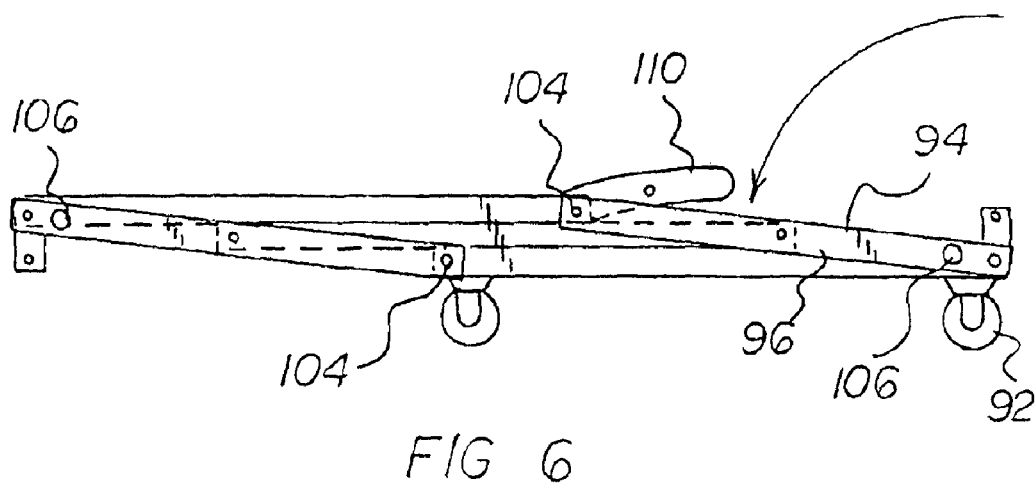

COLLAPSIBLE MAINTENANCE WORK CART SYSTEM

BACKGROUND OF THE INVENTION

1. Field of the Invention

The present invention relates to a collapsible maintenance work cart system and more particularly pertains to safely and conveniently using and storing a work cart.

2. Description of the Prior Art

The use of other work carts and apparatuses of known construction and configuration is known in the prior art. More specifically, other work carts and apparatuses of known construction and configuration previously devised and utilized for the purpose of allowing a user to safely and conveniently use a work cart are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 1,149,639 issued to Doust on Aug. 10, 1915 discloses work cart with a laundry bag suspended from it. U.S. Pat. No. 5,320,117 issued to Cook on Jul. 5, 1994 discloses a cart with lid apparatus. U.S. Pat. No. 4,923,202 issued to Breveglieri et. al on May 8, 1990 discloses a cart with an integral trash bag. U.S. Pat. No. 5,915,723 issued to Ausin on Jun. 29, 1999 discloses a collapsible utility cart with a collapsible pouch secured to the frame. U.S. Pat. No. 5,190,171 issued to Christman, Jr. on Mar. 2, 1993 discloses a multi-tiered collapsible cart. U.S. Pat. No. 1,961,394 issued to Rothe on Jun. 5, 1934 discloses a collapsible cart with slidable trays. U.S. Pat. No. 6,079,719 issued to Tisbo et al on Jun. 27, 2000 discloses a cart with slidable bins. Lastly, U.S. Pat. No. 200,635 issued to Bearly on Mar. 23, 1965 is a design patent for a linen cart.

While these devices fulfill their respective, particular objectives and requirements, the aforemrentioned patents do not describe collapsible maintenance work cart system that allows a user to sa-ey and conveniently use and store a work car.

In this respect, the collapsible maintenance work cart system according to the present invention substantially departs from the conventional concepts and designs of the prior art, and in doing so provides an apparatus primarily developed for the purpose of safely and conveniently using and storing a work cart.

Therefore, it can be appreciated that there exists a continuing need for a new and improved collapsible maintenance work cart system which can be used for safely and conveniently using and storing a work cart. In thins regard, the present invention substantially fulfills this need.

SUMMARY OF THE INVENTION

In view of the foregoing disadvantages inherent in the known types of other work carts and apparatuses of known construction and configuration now present in the prior art, the present invention provides an improved collapsible maintenance work cart system. As such, the general purpose of the present invention, which will be described subsequently in greater detail, is to provide a new and improved collapsible maintenance work cart system and method which has all the advantages of the prior art and none of the disadvantages.

To attain this, the present invention essentially comprises a collapsible maintenance work cart system for allowing a user to safely and conveniently use and store the cart. The system comprises, in combination, several components. First provided is a cart ease. The base is fabricated of rigid material and has a generally pan shaped rectilinear configuration. It has a forward end and a rearward end. It has an upper surface and a lower surface and a thickness there between. There are four downwardly oriented flaps. The flaps are bent downward thereby forming the pan shaped configuration. The flaps meet and form corners having right angles. A hole is formed in each end of each flap. The lower forward surface of the base has a plurality of mounting brackets. The forward end of the lower surface has a plurality of Z-shaped brackets aligned in parallel, in a front to rear orientation. The brackets are oriented along each side of the base.

Next provided is a cart base sliding shelf. The shelf has a generally rectilinear configuration with an upper surface and a lower surface arid a thickness there between. The shelf is sized to be received by the Z-shaped mounting brackets of the lower forward surface of the base. This allows the sliding shelf to be slidably mounted to the base so as to allow the shelf to be slid in and out of the confines of the cart.

Next provided is a cart middle shelf. The shelf is fabricated of rigid material and has a generally pan shaped rectilinear configuration. It has a forward end and a rearward end and with an upper surface and a lower surface and a thickness there between. There are four downwardly oriented flaps that thereby form the pan shaped configuration. The flaps meet and form corners having right angles. A holes is formed in each end of each flap.

Next provided is a cart top shelf. The shelf is fabricated of rigid material and has a generally pan shaped rectilinear configuration. The shelf has a forward end and a rearward end. It has an upper surface and a lower surface and a thickness there between. The four downwardly oriented flaps have a downward edge with the flaps meeting at the ends and forming corners having right angles. Each of the flaps have a hole near each end. The forward flap as a rectangular hole there through. The rearward end of the shelf has a rectangular hole there through to slidably receive arid hold a like shaped container. The flaps of the forward part of the shelf having a rectilinear sheet of rigid material coupled to the downward ends of the forward flap and two side flaps. The shelf and the sheet thereby forms a recess there within the forward edge.

Next provided is a plurality of T-pieces. Each is fabricated of rigid material and has an upper vertical portion and a lower vertical portion and a horizontal portion. Two T-pieces are coupled to the rearward corners of the cart base and two T-pieces are coupled to the forward corners of the cart top shelf along the horizontal portion of the T-piece. Each T-piece of the rearward base has a bolt hole through the lower vertical portion aid a locking pin hole through the upper vertical portion. Each T-piece of the forward too shelf has a bolt hole through the upper vertical portion and a locking pin hole through the lower vertical portion.

Next provided is a plurality of wheels with each being rotatably coupled to the lower surface of the cart base and each located a: a corner of thc base. Next provided is a frame. The frame is fabricated of rigid material and has four vertical corner pieces. Each corner piece has an upper end and a lower end and a middle portion there between. Each vertical corner piece has a bolt hole at the upper end and at the middle and at the lower end. And each corner piece has a locking pin hole at the lower end, wit the pin hole being located above the lower end bolt hole so as to allow the vertical corner pieces to be rotatable in a two dimensional plane about the bolt hole.

Next provided is a plurality of bolt and nut subassemblies. Each bolt and nut subassembly couples the corner pieces and the flaps of the cart shelves. The coupling allows the rotation of the shelves and tile corner pieces in a two dimensional plane and thereby allowing the collapsing of the cart.

Next provided is a handle. The handle has a gripping portion and an attachment portion and a roll towel mounting portion. The attachment portion has a plurality of bolt holes and is coupled with the bolt and nut subassembly to the upper shelf at the point of coupling of the corner piece ard the shelf. The handle also is able to be rotated in a two dimensional plane when the cart is collapsed. Next provided is a locking pin subassembly having a pin portion and a spring. The pin portion has a handle and a spring retainer and a pin shaft. The handle is coupled to the shaft and the pin subassembly is coupled to the lower portion of the corner piece of the cart through the locking pin hole. The locking pin protrudes through the corner piece and is aligned with and received into the pin hole in the upper vertical portion of the T-piece. This allows the cart corner pieces to be locked in position when in use.

Lastly provided is a laundry bag ring. The ring has a round bag mounting portion and a pair of round cylindrical protruding mounts sized to be received by the recess in the forward edge of the top shelf.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In his respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods ard systems for carrying out the several purposes of the present invention. It is important, therefore, that the claims be regarded as including such equivalent constructions insofar as they do not depart from the spirit and scope of the present invention.

It is therefore an object of the present invention to provide a new and improved collapsible maintenance work cart system which has all of the advantages of the prior art other work carts and apparatuses of known construction and configuration and none of the disadvantages.

It is another object of the present invention to provide a new and improved collapsible maintenance work cart system which may be easily aid efficiently manufactured and marketed.

It is further object of the present invention to provide a new and improved collapsible maintenance work cart system which is of durable and reliable constructions.

An even further object of the present invention is to provide a new and improved collapsible maintenance work cart system which is susceptible of a low cost of manufacture with regard to both materials and labor, and which accordingly is then susceptible of low prices of sale to the consuming public, thereby making such collapsible maintenance work cart system economically available to the buying public.

Woven still another object of the present invention is to provide a collapsible maintenance work cart system for allowing a user to safely and conveniently use and store a work cart.

Lastly, it is an object of the present invention to provide a new and improved collapsible work cart system comprising several components in combination. A cart base has a generally pan shaped rectilinear configuration with four corners and a plurality of Z-shaped brackets. A car: base sliding shelf is received by the Z-shaped brackets. A cart middle shelf has a generally pan shaped rectilinear configuration. Next, a cart top shelf has a generally pan shaped rectilinear configuration with four corners having right angles and four edges. The top shelf has a forward edge. There is a hole near each end of the shelf. The forward pan edge has a recess there within. There is a plurality of T-pieces with each having an upper vertical portion and a lower vertical portion and a horizontal portion. Two pieces are coupled to the lower, rearward corners of the cart and two pieces are coupled to the upper, forward corners of the cart. Each T-piece has a bolt hole and a locking pin hole. There is a plurality of rotatable wheels. There is a frame having four vertical corner pieces with each having a plurality of bolt holes. There is a plurality of bolt, and nut subassemblies. There is a handle having a gripping portion and an attachment portion and a roll towel mounting portion. The system includes a locking pin subassembly having a pin portion and a spring. Lastly provided, there is a laundry bag ring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an overview of the cart taken along line 3—3 of FIG. 1.

FIG. 4 is a side view of the cart taken at circle 4 of FIG. 1, demonstrating the container and container hole in the top shelf.

FIG. 5 is a head-on close up view of the locking pin and frame near the rotatable wheel of the cart.

FIG. 5-A is a side view of the locking mechanism of the locking pin taken along line 5A—5A of FIG. 5.

FIG. 6 is a site elevation view of the cart in the collapsed state.

The same reference numerals refer to the same parts throughout the various Figures.

DESCRIPTION OF THE PREFERRED EMBODIMENT

Figure 1:
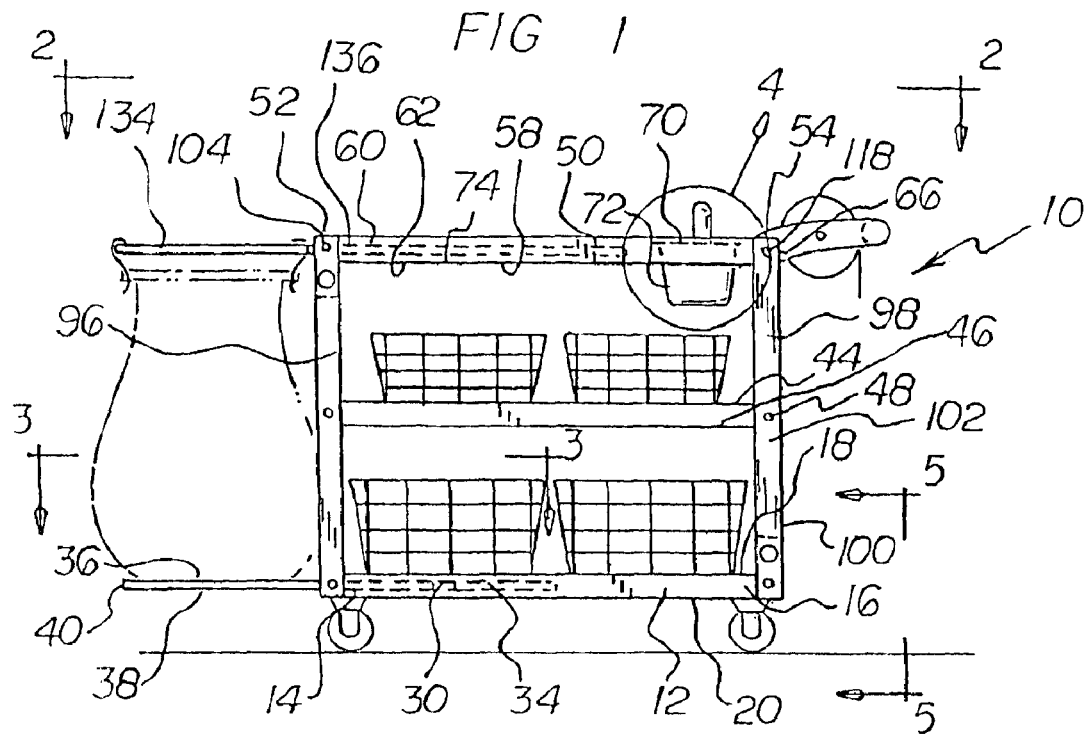
FIG. 1 is a side elevation of the work cart showing the placement of the laundry bag and container.
Figure 2:
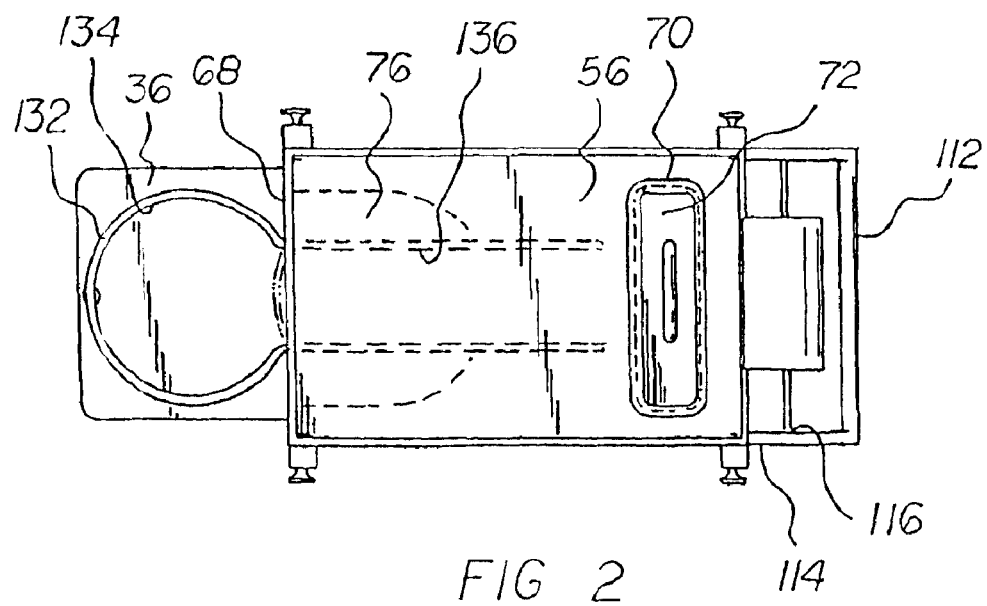
FIG. 2 is an overhead view of the cart taken along line 2—2 of FIG 1.

With reference now to the drawings, and in particular to FIG. 1 thereof, the preferred embodiment of the new and improved collapsible maintenance work cart system embodying the principles and concepts of the present invention and generally designated by the reference numeral 10 will be described.

The present invention, the collapsible maintenance work cart system 10 is comprised of a plurality of components.

Such components in their broadest context include a frame, a plurality of shelves, a plurality of subassemblies and a plurality of rotatable wheels. Such components are individually configured and correlated with respect to each other so as to attain the desired objective.

A collapsible maintenance work cart system 10 is provided for allowing a user to safely and conveniently use and store the car. The system comprises, in combination, several components. First provided is a cart base 12. The base is fabricated of rigid material and has a generally par shaped rectilinear configuration. It has a forward end 14 and a rearward end 16. It has an upper surface 18 and a lower surface 20 and a thickness there between.

There are four downwardly oriented flaps 22. The flaps are bent downward thereby forming the pan shaped configuration. The flaps meet and form corners having right angles. A hole 26 is formed in each end of each flap.

The lower forward surface of the base has a plurality of Z-shaped mounting brackets 30 aligned in parallel, in a front to rear orientation. The brackets are oriented along each side of the base.

Next provided is a cart base sliding shelf 34. The shelf has a generally rectilinear configuration with an upper surface 36 and a lower surface 38 and a thickness 40 there between. The shelf is sized to be received by the Z-shaped mounting brackets of the lower forward surface of the base. This allows the sliding shelf to be slidably mounted to the base so as to allow the shelf to be slid in and out of the confines of the cart.

Next provided is a cart middle shelf 44. The shelf is fabricated of rigid material and has a generally pan shaped rectilinear configuration. It has a forward end and a rearward end and with an upper surface and a lower surface and a thickness there between. There are four downwardly oriented flaps 46 that thereby form the pan shaped configuration. The flaps meet and form corners having right angles. A hole 48 is formed in each end of each flap Next provided is a cart top shelf 50. The shelf is fabricated of rigid material and has a generally pan shaped rectilinear configuration. The shelf has a forward end 52 and a rearward end 54. It has an upper surface 56 and a lower surface 58 and a thickness 60 there between.

The four downwardly oriented flaps have a downward edge 62 with the flaps meeting at the ends and forming corners having right angles. Each of the flaps have a hole 66 near each end. The forward flap has a rectangular hole 68 there through.

The rearward end of the shelf has a rectangular hole 70 there through to slidably receive and hold a like shaped container 72. The flaps of the forward part of the shelf having a rectilinear sheet 74 of rigid material coupled to the downward ends of the forward flap and two side flaps. The shelf and the sheet thereby forms a recess 76 there within the forward edge.

Next provided is a plurality of T-pieces 80. Each is fabricated of rigid material and has an upper vertical portion 82 and a lower vertical portion 84 and a horizontal portion 86. Two T-pieces are coupled to the rearward corners of the cart base and two T-pieces are coupled to the forward corners of the cart top shelf along the horizontal portion of the T-piece. Each T-piece of the rearward base has a belt hole 88 through the lower vertical portion and a locking pin hole 90 through the upper vertical portion. Each T-piece of the forward top shelf has a bolt hole 38 through the upper vertical portion ard a locking pan hole 90 through the lower vertical portion Next provided is a plurality of wheels 92 with each being rotatably coupled to the lower surface of the cart base and each located at a corner of the base.

Next provided is a frame 94. The frame is fabricated of rigid material and has foul vertical corner pieces 96. Each corner piece has an upper end 98 and a lower end 100 and a middle portion 102 there between. Each vertical corner piece has a bolt hole 101 at the upper end and at the middle and at the lower end. And each corner piece has a locking pin hole 106 at the lower end, with the pin hole being located above the lower end bolt hole so as to allow the vertical corner pieces to be rotatable in a two dimensional plane about the bolt hole.

Next provided is a plurality of bolt and nut subassemblies 108. Each bolt and nut subassembly couples the corner pieces and the flaps of the cart shelves. The coupling allows the rotation of the shelves and the corner pieces ir a two dimensional plane and thereby allowing the collapsing of the cart.

Next provided is a handle 110. The handle has a gripping portion 112 and an attachment portion 114 and a roll towel mounting portion 116. The attachment portion has a plurality of bolt holes 118 and is coupled with the bolt ard nut subassembly to the upper shelf at the point of coupling of the corner piece and the shelf. The handle also is able to be rotated in a two dimensional plane when the cart is collapsed.

Next provided is a locking pin subassembly 120 having a pin portion 122 and a spring 124. The pin portion has a handle 126 and a spring retainer 128 and a pin shaft 130. The handle is coupled to the shaft and the pin subassembly is coupled to the lower portion of the corner piece of the cart through the locking pin hole. The locking pin protrudes through the corner piece and is aligned with and received into the pin hole in the upper vertical portion of the T-piece. This allows the cart corner pieces to be locked in position when in use. The entire system is fabricated of rigid material, preferably plastic.

Lastly provided is a laundry bag ring 132. The ring has a round bag mounting portion 134 and a pair of round cylindrical protruding mounts 136 sized to be received by the recess in the forward edge of the top shelf.

As the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations, in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and charges will readily occur to those skilled in the art, it is not desired to limit the invention to the exact construction and operation shown and described, and accordingly, all suitable modifications and equivalents may be resorted to, falling within the scope of the inventor.

What is claimed as being new and desired to be protected by Letters Patent of the United States is as follows:

1. A collapsible maintenance work cart system for allowing a user to safely and conveniently use and store a work cart, comprising, in combination:

a cart base fabricated of rigid material having a generally pan shaped rectilinear configuration with a forward end, a rearward end, an upper surface, a lower surface and a thickness there between; the cart base having four downwardly oriented flaps forming the pan shaped configuration with right angle corners formed where the flaps meet; a hole at each end of each flap; the lower forward surface of the base having a plurality of mounting brackets and the forward end of the lower surface having a plurality of Z-shaped brackets aligned in parallel in a front to rear orientation and oriented along each side of the base;

a cart base sliding shelf having a generally rectilinear configuration, an upper surface, a lower surface and a thickness therebetween, the cart base sliding shelf sized to be received by the Z-shaped mounting brackets of the lower forward surface of the base to allow the sliding shelf to be slidably mounted to the base allowing the shelf to be slid in and out of the confines of the cart;

a cart middle shelf fabricated of rigid material having a generally pan shaped rectilinear configuration, a forward end, a rearward end, an upper surface, a lower surface and a thickness there between; the cart middle shelf having four downwardly oriented flaps thereby forming the pan shaped configuration with the flaps meeting and forming right angle corners the flaps having a hole at each end, the cart middle shelf being positioned in a middle region of the cart base;

a cart top shelf fabricated of rigid material having a generally pan shaped rectilinear configuration with a forward end a rearward end an upper surface a lower surface, and a thickness there between; the cart top shelf having four downwardly oriented flaps having a downward edge and thereby forming the pan shaped configuration with the flaps meeting at the ends and forming right angle corners; the flaps having a hole near each end, the forward flap having a rectangular hole there through and the rearward end of the shelf having a rectangular hole there through to slidably receive and hold a container the flaps of the forward part of the shelf having a rectilinear sheet of rigid material coupled to the downward ends of the forward flap and two side flaps thereby forming a recess there within, a plurality of T-pieces fabricated of rigid material having an upper vertical portion, a lower vertical portion, a horizontal portion with two T-pieces being coupled to the rearward corners of the cart base and base, two T-pieces being coupled to the forward corners of the cart top shelf along the horizontal portion of the T-piece; each T-piece of the rearward base having a bolt hole through the lower vertical portion and a locking pin hole through the upper vertical portion; each T-piece of the forward top shelf having a bolt hole through the upper vertical portion and a locking pin hole through the lower vertical portion;

a plurality of wheels rotatably coupled to the lower surface of the cart base each of the wheels busing located at a corner of the base;

a frame fabricated of rigid material having four vertical corner pieces each having an upper end and a lower end and a middle portion there between, a bolt hole at the upper end, at the middle and the lower ends and a locking pin hole at the lower end, the pin hole being located above the lower end bolt hole so as to allow the vertical corner pieces to be rotatable in two-dimensional planes about the bolt hole;

a plurality of bolt and nut subassemblies, coupling the corner pieces and the flaps of the cart shelves so as to allow the rotation of the shelves and the corner pieces in two dimensional planes;

a handle having a gripping portion, an attachment portion having a plurality of bolt holes therethrough towel mounting portion, the attachment portion coupled with the bolt and nut subassembly to the upper shelf at the point of coupling of the corner piece and the shelf; the handle rotatable in two dimensional planes when the cart is collapsed;

a locking pin subassembly having a pin portion and a spring; the pin portion having a handle and coupled to the shaft; a spring retainer and a pin shaft, the pin subassembly being coupled to the lower portion of the corner piece of the cart through the locking pin hole, the pin protruding through the corner piece and aligned with and receivable into the pin hole in the upper vertical portion of the T-piece so as to allow the cart corner pieces to be locked in position in use; and a laundry bag ring having a round bag mounting portion and a pair of round cylindrical protruding mounts sized to be received by the recess in the forward edge of the top shelf.

2. A collapsible work cart system comprising, in combination:

a cart base having a generally pan shaped rectilinear configuration with four corners and a plurality of brackets;

a cart base sliding shelf received by the brackets;

a cart middle shelf having a generally pan shaped rectilinear configuration, the cart middle shelf being positioned in a middle region of the cart base;

a cart top shelf having a generally pan shaped rectilinear configuration with four right angle corners and four edges, including a forward edge, with a hole near each end of the shelf and a recess in the forward pan edge the cart top shelf being positioned in a top region of the cart base;

a plurality of T-pieces each having an upper vertical portion, a lower vertical portion, and a horizontal portion, each T-piece being and coupled to one of the corners of the cart, a bolt hole and a locking pin hole through each T-piece;

a plurality of rotatable wheels coupled to the cart base;

a frame having four vertical corner pieces having a plurality of bolt holes coupled tot the cart base;

a plurality of bolt and nut subassemblies coupling the cart base, shelves and frame;

a handle coupled to the frame, the handle having a gripping portion, an attachment portion and a roll towel mounting portion;

a locking pin subassembly coupling the T-pieces and corner, the locking pin subassembly having a pin portion and a spring; and a bag ring coupled to the top shelf.

3. A work cart as described in claim 2 wherein the top shelf has a forward end with a recess and a rearward and wherein the bag holding ring has a generally round configuration with two protruding support members which project rearwardly and wherein holding ring sized to be received within the recess of the top shelf of the cart allowing slidable movement of the shelf in and out of the recess.

4. A work cart as described in claim 2 wherein top shelf has a hole there through to receive and hold a container within the hole.

* * * * *